United States Patent
Sharma et al.

(10) Patent No.: US 10,488,948 B2
(45) Date of Patent: Nov. 26, 2019

(54) ENABLING PHYSICAL CONTROLS ON AN ILLUMINATED SURFACE

(71) Applicant: Texas Instruments Incorporated, Dallas, TX (US)

(72) Inventors: Vinay Sharma, Dallas, TX (US); Frank Sharp, Mesquite, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 13/828,526

(22) Filed: Mar. 14, 2013

(65) Prior Publication Data

US 2013/0241822 A1    Sep. 19, 2013

Related U.S. Application Data

(60) Provisional application No. 61/610,859, filed on Mar. 14, 2012.

(51) Int. Cl.
| | |
|---|---|
| *G06F 3/0362* | (2013.01) |
| *G06F 3/042* | (2006.01) |
| *G06F 3/03* | (2006.01) |
| *G06F 3/02* | (2006.01) |
| *G06F 3/039* | (2013.01) |
| *G06F 3/041* | (2006.01) |

(52) U.S. Cl.
CPC .............. *G06F 3/0304* (2013.01); *G06F 3/02* (2013.01); *G06F 3/039* (2013.01); *G06F 3/0362* (2013.01); *G06F 3/0416* (2013.01); *G06F 3/0425* (2013.01)

(58) Field of Classification Search
None
See application file for complete search history.

(56) References Cited

U.S. PATENT DOCUMENTS

| | | | |
|---|---|---|---|
| 5,107,253 A | 4/1992 | Meadows | |
| 7,093,974 B2 * | 8/2006 | Kienitz | G01J 5/02 |
| | | | 348/E5.026 |
| 7,859,717 B2 * | 12/2010 | Fukuda | 358/1.9 |
| 8,781,151 B2 * | 7/2014 | Marks et al. | 382/100 |
| 2002/0196343 A1 * | 12/2002 | Navab | H04N 7/18 |
| | | | 348/157 |
| 2005/0168448 A1 * | 8/2005 | Simpson | G06F 3/0425 |
| | | | 345/173 |

(Continued)

FOREIGN PATENT DOCUMENTS

JP         2001350576 A  * 12/2001  ............... G06F 3/03

OTHER PUBLICATIONS

Geoff Walker, "Camera-Based Optical Touch Technology", Information Display, Mar. 2011, vol. 27, No. 3, pp. 30-34, Society for Information Display (SID).

(Continued)

*Primary Examiner* — Parul H Gupta
(74) *Attorney, Agent, or Firm* — Ebby Abraham; Charles A. Brill; Frank D. Cimino

(57) ABSTRACT

A method for enabling physical controls in a digital system is provided that includes receiving an image of an illuminated surface in the digital system, wherein the image is captured by a camera in the digital system, determining a state of a physical control mounted on the illuminated surface by analyzing the image; and outputting an indication of the state of the physical control.

18 Claims, 10 Drawing Sheets

(56) References Cited

U.S. PATENT DOCUMENTS

2006/0092170 A1* 5/2006 Bathiche ................ A63F 13/02
    345/589
2008/0284726 A1* 11/2008 Boillot ................... G06F 3/0304
    345/156
2011/0227876 A1* 9/2011 Ilmonen ................. G06F 3/0425
    345/175

OTHER PUBLICATIONS

Geoff Walker and Mark Fihn, "Beneath the Surface", Information Display, Mar. 2010, vol. 26, No. 3, pp. 32-34, Society for Information Display (SID).
Ian Maxwell, "An Overview of Optical-Touch Technologies", Information Display, Dec. 2007, vol. 23, No. 12, pp. 26-30, Society for Information Display (SID).

* cited by examiner

US 10,488,948 B2

ENABLING PHYSICAL CONTROLS ON AN ILLUMINATED SURFACE

CROSS-REFERENCE TO RELATED APPLICATIONS

This application claims benefit of U.S. Provisional Patent Application Ser. No. 61/610,859, filed Mar. 14, 2012, which is incorporated herein by reference in its entirety. This application is related to co-pending U.S. patent application Ser. No. 13/828,292, filed Mar. 14, 2013, co-pending U.S. patent application Ser. No. 13/828,641, filed Mar. 14, 2013, co-pending U.S. patent application Ser. No. 13/828,736, filed Mar. 14, 2013, and co-pending U.S. patent application Ser. No. 13/828,404, filed Mar. 14, 2013, which are incorporated by reference herein in their entirety.

BACKGROUND OF THE INVENTION

Field of the Invention

Embodiments of the present invention generally relate to enabling physical controls on an illuminated surface.

Description of the Related Art

Touch displays are used in many consumer applications (e.g., smart phones, computer displays, medical imaging devices, automotive control displays, etc.) to provide an intuitive user interface. The touch detection technology used in such displays includes electrical capacitance detection, electrical resistance detection, and optical detection. For optical touch detection, one or more imaging sensors and a light source (e.g., one or more infrared cameras and infrared light-emitting diodes (LEDs)) may be used to capture images of a touch surface.

Most touch display systems currently available use graphics to create virtual controls for applications. However, these graphical virtual controls do not offer the tactile feedback of physical controls. The ability to touch and feel a physical control, e.g., a knob, slider, button, switch, etc., is especially valuable in scenarios where the user needs to interact with a touch screen without looking at it, such as changing the volume of a sound system while driving.

SUMMARY

Embodiments of the present invention relate to methods, apparatus, and computer readable media for enabling physical controls mounted on an illuminated surface. In one aspect, a method for enabling physical controls in a digital system is provided that includes receiving an image of an illuminated surface in the digital system, wherein the image is captured by a camera in the digital system, determining a state of a physical control mounted on the illuminated surface by analyzing the image; and outputting an indication of the state of the physical control.

In one aspect, a digital system is provided that includes an illuminated surface, a physical control mounted on the illuminated surface, a camera positioned to capture images of the illuminated surface, means for receiving an image of the illuminated surface captured by the camera, means for determining a state of the physical control by analyzing the image, and means for outputting an indication of the state of the physical control.

In one aspect, a computer readable medium storing software instructions that, when executed by a processor in a digital system, cause the digital system to perform a method for enabling physical controls included in the digital system. The method includes receiving an image of an illuminated surface included in the digital system, wherein the image is captured by a camera included in the digital system, determining a state of a physical control mounted on the illuminated surface by analyzing the image, and outputting an indication of the state of the physical control.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
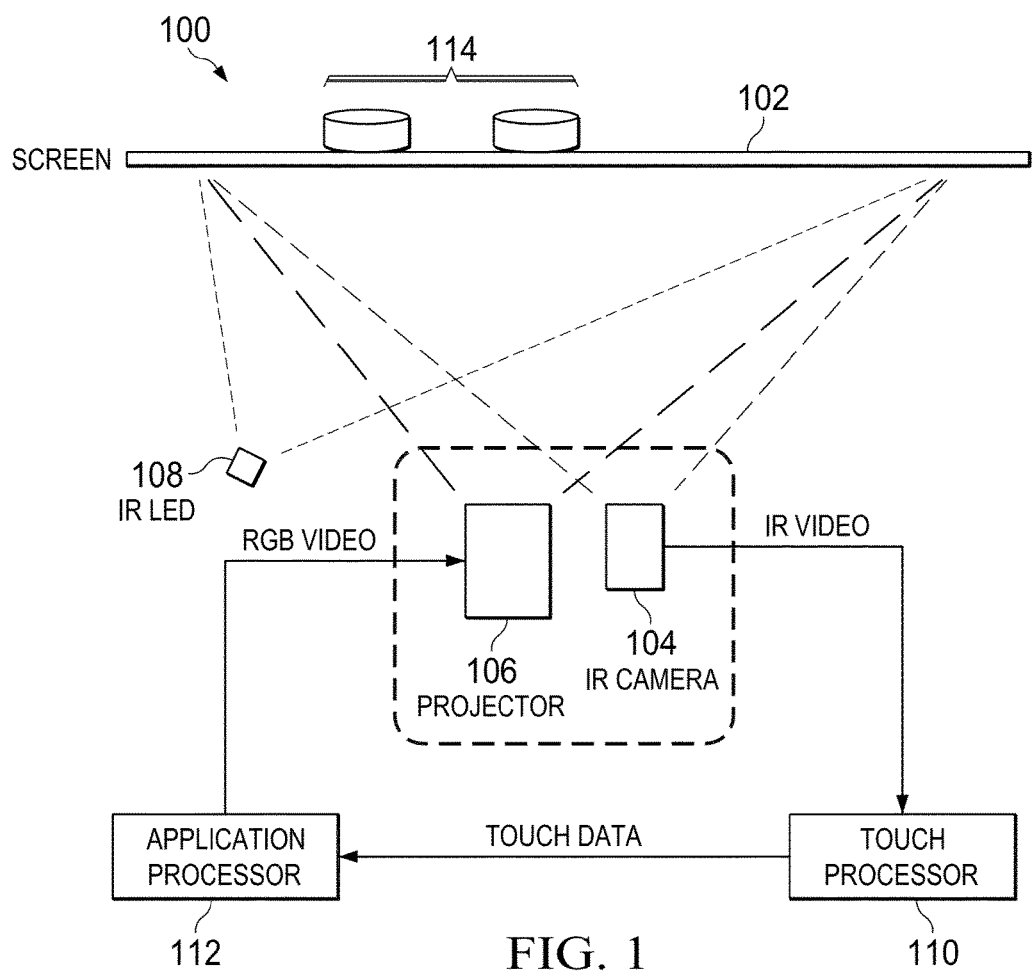
FIG. 1 is a high level block diagram of an example optical touch display system.

Specific embodiments of the invention will now be described in detail with reference to the accompanying figures. Like elements in the various figures are denoted by like reference numerals for consistency.

Embodiments of the invention provide for recognition of the state of a physical control mounted on an illuminated surface in an optical touch detection system. Computer vision analysis techniques are applied to the analysis of images of the illuminated surface captured by a camera to locate physical controls mounted on the illuminated surface and to determine the state of each physical control. Further, in some embodiments, physical controls are uniquely identified based on patterns encoded on the physical controls.

FIG. 1 is a high level block diagram of an example optical touch detection system 100. The optical touch detection system 100 includes a screen 102, an IR camera 104, a projector 106, one or more IR LEDs 108, a touch processor 110, an application processor 112, and one or more physical controls 114 mounted on the surface of the screen 102. The projector 106 is placed behind the screen 102 and projects RGB video from the application processor 112 on the rear surface of the screen 102. The projector 106 may be any suitable projection system, such as, for example, a digital light processing (DLP) projection system, a liquid crystal display (LCD) projection system, or a liquid crystal on silicon (LCOS) projection system.

The IR light emitting diodes 108 are placed behind the screen 102 and arranged to flood IR light through the rear surface of the screen 102, with some IR light reflecting back from the screen 102. The IR camera 104 is placed behind the screen and is arranged to capture a video of IR images formed from the IR light impinging on the sensor. When an object, e.g., a finger, pen, etc., touches the surface of the screen 102, the IR images (frames) in the video change in the location of the touch as the IR light transmitting through the screen 102 is reflected back at the touch location and captured by the camera sensor. Further, the images change as an object, such as a user's hand, moves in front of the screen 102 within sufficient proximity to cause IR light reflections. In addition, if an object such as a physical control 114 is mounted on the screen 102, some of the IR light will reflect off the object, back through the screen, and toward the IR camera sensor 104. In this scenario, this IR light will cause some of the pixels of the image to have a high intensity value as compared to the rest of the image.

Figure 2A:
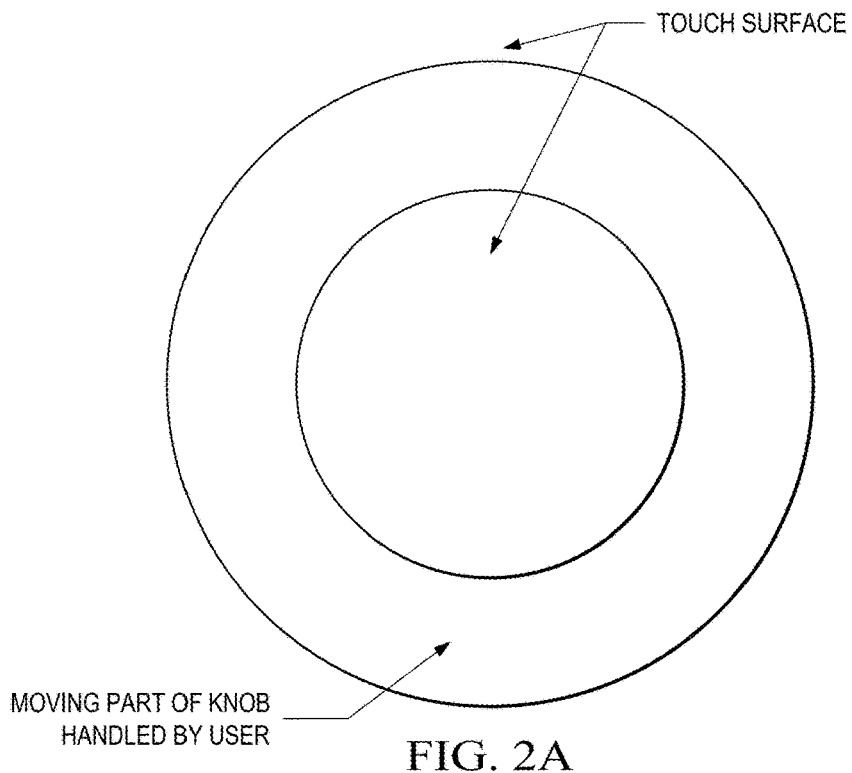
FIGS. 2A-2D are an example of an annular physical control.
Figure 2B:
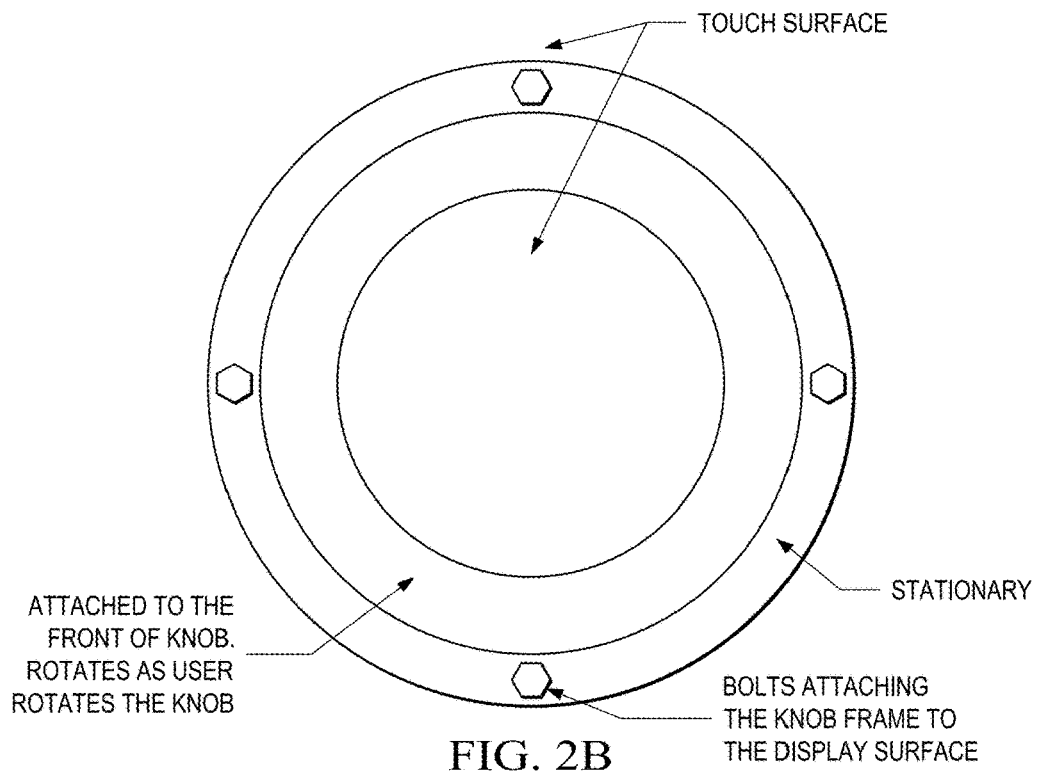
Figure 2C:
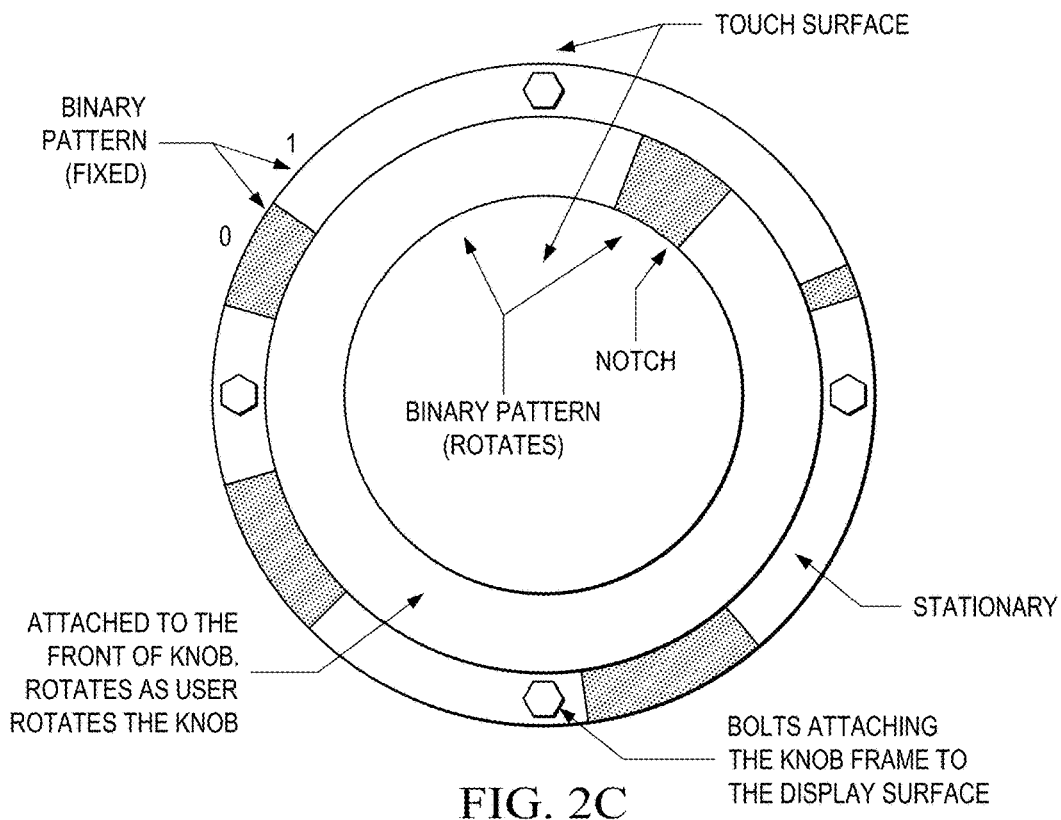

The physical controls 114 may be one or more of a knob, a dial, a slider, a switch, or the like. The surface of a physical control that is in contact with the screen 102 is encoded with a suitable binary pattern. The binary pattern is applied using an IR reflective substance to denote a 1 ("on", "high") and an absorptive substance to denote a 0 ("off", "low"). FIGS. 2A-2D are an example of a knob with an annular (ring-like) profile. FIG. 2A shows the ring-shaped knob visible to the user and FIG. 2B shows the back surface of the knob that is visible to the camera 104. In FIG. 2B, the outer ring is part of the fixed mounting mechanism that attaches the knob to the screen. The inner ring is the back surface of the part of the knob that the user rotates. As illustrated in FIG. 2C, the back surfaces of the knob are annotated with a binary pattern. In this example, the outer ring and the inner ring have separate binary patterns. Since the outer ring is stationary, this binary pattern remains static as the knob is rotated. In some embodiments, the binary pattern of the outer ring is treated as a unique signature that is used to identify the knob and differentiate it from other knobs mounted on the screen. In such embodiments, each knob mounted on the screen has a unique binary pattern on the outer ring. The binary pattern on the inner ring is used to determine the angle of rotation of the knob. The inner ring rotates as the knob is rotated by the user and the binary pattern on the inner ring is analyzed to determine how far the knob has been rotated. A state indicator, also referred to as a notch, is encoded in the pattern on the inner ring.

The touch processor 110 receives IR video from the IR camera 104 and processes each frame to identify touch data such as touch locations, gestures, touch trajectory, a change in state of a physical control 114, etc. The touch processor 110 is configured to perform an embodiment of a method for locating a physical control and determining a state of the physical control as described herein in reference to FIGS. 3-7.

The application processor 112 hosts applications available to a user of the optical touch detection system 100 and provides the RGB video, e.g., a touch activated user interface, which is to be displayed on the screen 102 by the projector 106. The application processor 112 receives touch data from the touch processor 110 and uses the touch data to determine what, if any, actions are to be performed responsive to the touch data. For example, if the touch data indicates that a user has changed the state of a physical control 114, the application processor 112 may execute an application associated with that physical control.

FIGS. 3-7 are flow diagrams of a method for enabling physical controls on display screen (one example of an illuminated surface) in an optical touch detection system such as that of FIG. 1. The method assumes that a bounding box is provided for each physical control. The bounding box for each physical control specifies a rectangular area where the control can be located in an image of the display screen. For example, a bounding box can be specified as the coordinates of the top left corner of the box, the coordinates of the top right corner of the box, the width, and the height. Each bounding box is assumed to include a single physical control and no other object, e.g., part of another physical control. The movable part of each physical control is assumed to be encoded with a binary pattern. This binary pattern may be the same for all physical controls mounted on the display screen. In some embodiments, the fixed part of each physical control is assumed to be encoded with a binary pattern distinct from that of the movable part and distinct from the binary pattern used the fixed part of any other physical control mounted on the display screen. In such embodiments, a library of binary patterns is also assumed to be provided that may be used to identify each physcal control. In some embodiments, the fixed part of each physcal control is assume to coated with a highly reflective IR substance with no binary pattern.

For simplicity of explanation, embodiments of the method are described assuming that the physical controls are knobs. One of ordinary skill in the art, having benefit of this description, will understand embodiments for other ring-like physical controls, for circular controls, and for physical controls of other shapes, e.g., a slider bar or switch. Further, the images referred to below may be pre-processed prior to being received by the method. Such pre-processing may include, for example, image smoothing, de-noising, combining pairs of images, etc.

Figure 2D:
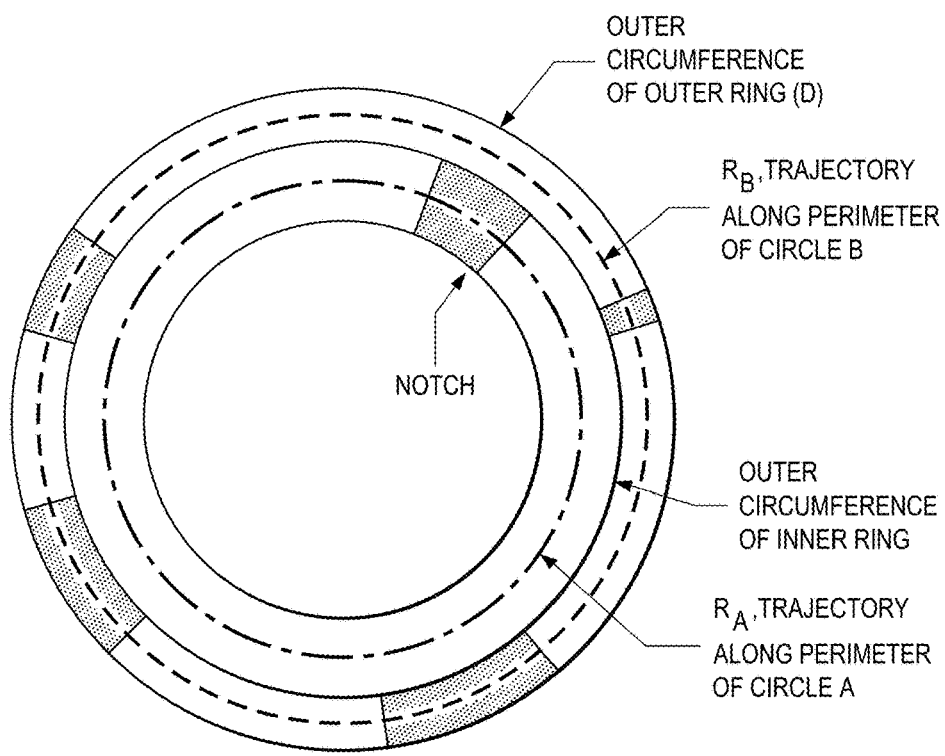
Figure 3:
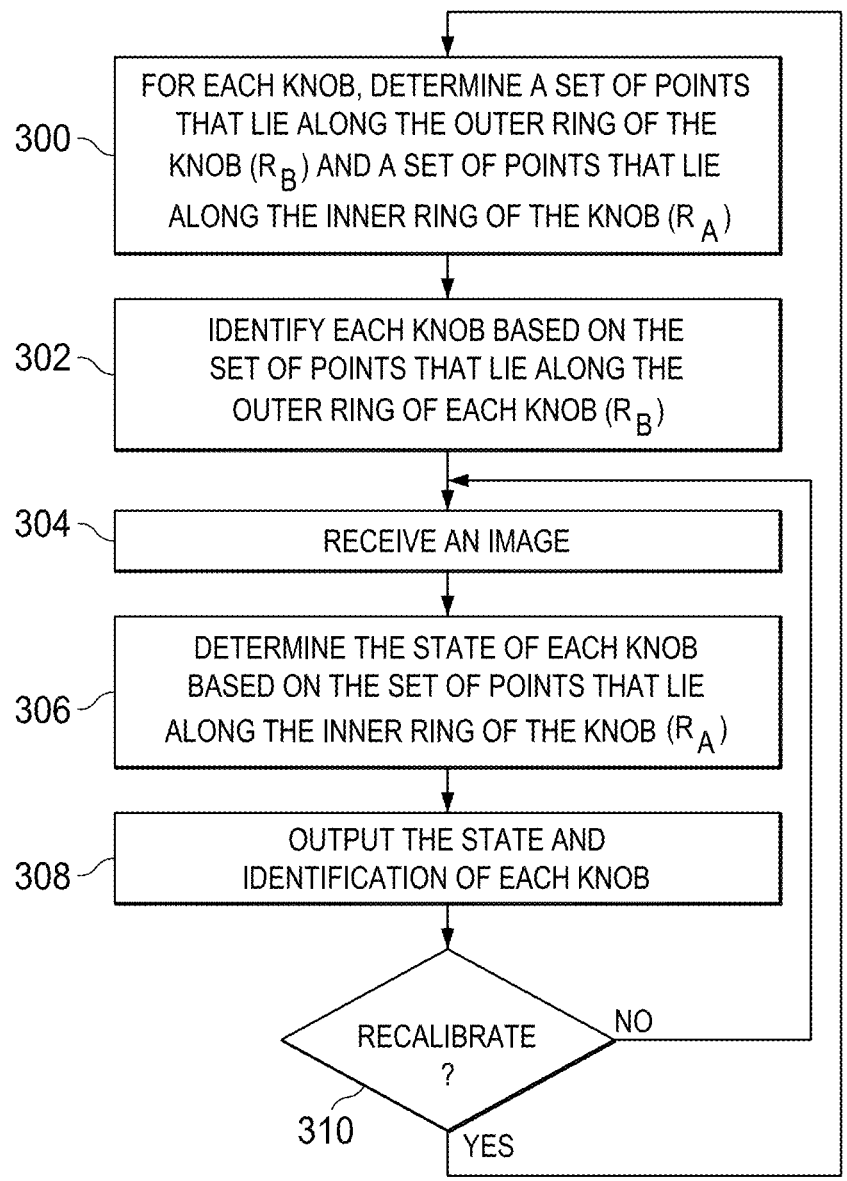

Referring now to FIG. 3, initially calibration is performed 300 to locate each knob mounted on the display screen. The calibration operates to analyze one or more images of the display screen captured by the IR camera to determine a set of points $R_B$ that lie along the outer (fixed) ring of each knob and a set of points $R_A$ that lie along the inner (movable) ring of each knob. FIG. 2D shows an example illustrating the positions of $R_A$ and $R_B$. Any suitable technique may be used to identify these point sets. For example, the convex hull method of FIG. 4 or the motion difference method of FIG. 5 may be used.

Each knob is then identified 302 based on the set of points $R_B$ determined for the knob during calibration. A method for identifying a knob based on $R_B$ is described below in reference to FIG. 6.

After the calibration and knob identification, the knobs are ready to be used in normal system operation. In general, images of the display screen captured by the IR camera are received 304 and each image is analyzed to determine 306 the state of each knob based on the set of points $R_A$ determined for the knob during calibration. A method for determining the state of a knob based on $R_A$ is described below in reference to FIG. 7. For each knob, the state and its identification are output 308 for further processing.

A check is then made 310 to determine if recalibration is to be performed. Recalibration may be needed as one or more system component may change in position or behavior over time. For example, the screen may change shape over time due to age, heat, mechanical stress, etc., thus affecting the computed locations of the point sets $R_A$ and $R_B$ computed for each knob. In another example, the camera may be affected over time such that the quality of the captures images is reduced. Any suitable criteria for deciding if recalibration is needed may be used. For example, the recalibration can be triggered periodically, e.g., once every 24 hours, once a year, etc. In another example, the recalibration could be initiated by a user and the recalibration check would check for, e.g., a user-initiated recalibration event.

In another example, the recalibration may be triggered automatically based on changes in the binary string recovered from $R_B$. Recovery of the binary string is described below in reference to FIG. 6. A change significant enough to require recalibration may be determined as follows. Given the current binary string $B_t$ and the original binary string $B_0$ computed during calibration, if the condition distance($B_t$, $B_0$)>$T_R$, where $T_R$ is a predetermined recalibration threshold, is true, the change is sufficiently significant to trigger recalibration. The "distance" between $B_t$ and $B_0$ may be computed in any suitable way. For example, the Hamming distance may be used. The recalibration threshold controls how sensitive the overall knob estimation should be to small changes in $R_B$, and hence in $R_A$.

Figure 8:
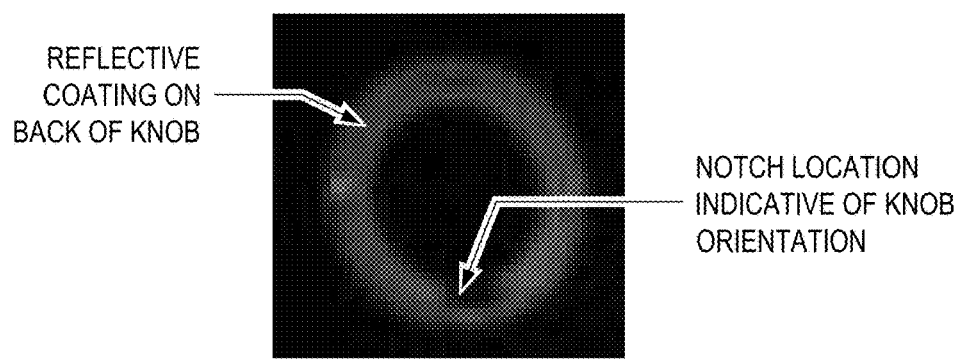
FIGS. 8-12 are examples.

In some embodiments, the initial calibration 300 may be performed offline and initial values for $R_B$ and $R_A$ for each knob stored, e.g., in the optical touch detection system. In some embodiments, the knob identification may not be performed. In such embodiments, the set of points $R_B$ may not be determined depending on the particular technique used to determine $R_A$. Further, the fixed (outer) parts of the knobs are not required to be encoded with distinct binary patterns. Rather, the outer ring of the control may be coated with a reflective material. FIG. 8 shows an actual example of an image of a knob with no binary pattern on the outer (fixed) ring. Instead, the outer ring is coated with a reflective material.

Figure 4:
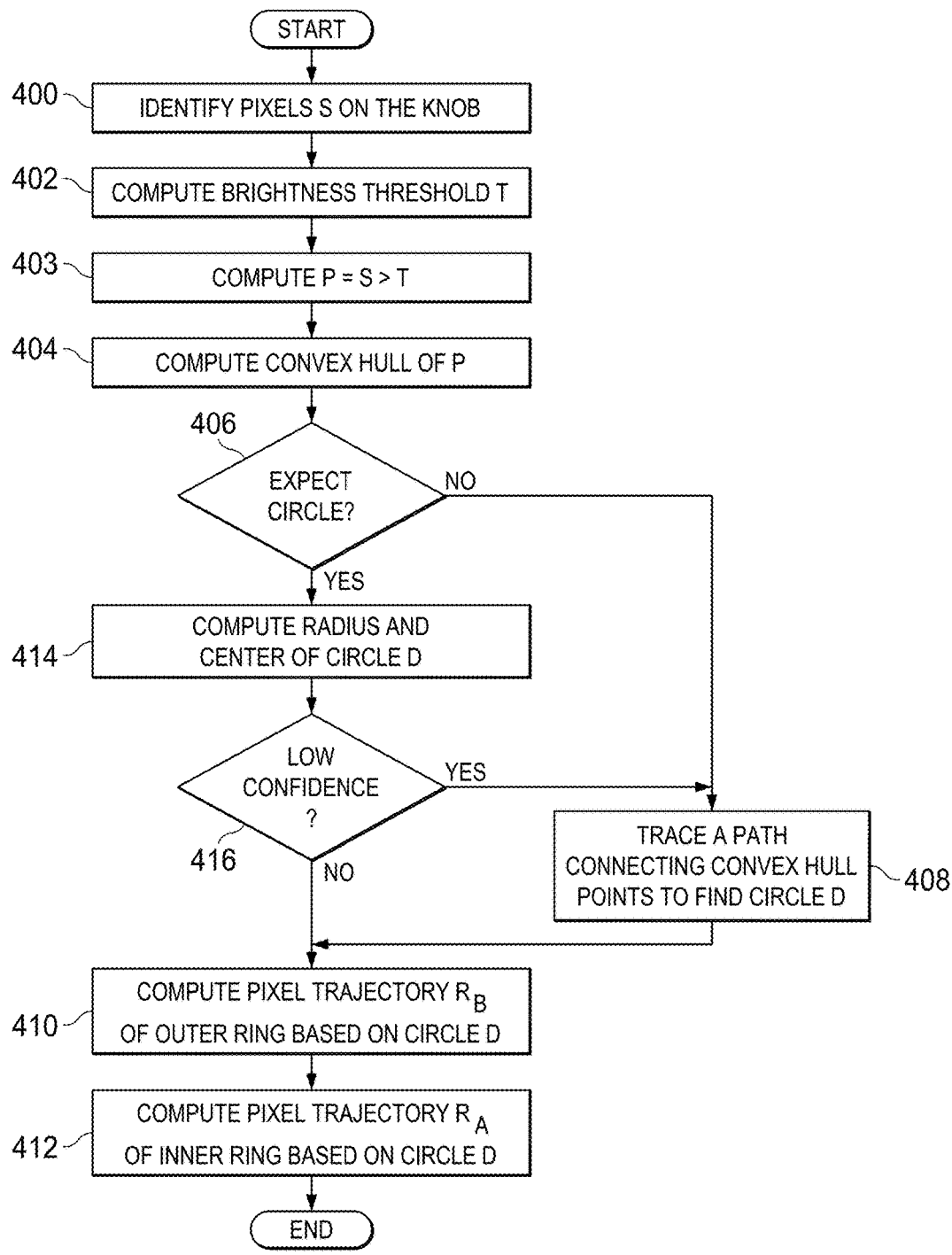
FIGS. 4-7 are flow diagrams of a method for enabling physical controls in an optical touch detection system.

FIG. 4 is a flow diagram of a method for identifying the pixel trajectories $R_B$ and $R_A$ of a knob from an image. Initially, a sub-image of pixels S contained within the bounding box for the knob is extracted from the image. A brightness threshold T is computed 402 from S and is applied 403 to the pixels in S to identify the bright pixels P in S. P is the set of all the "on" pixels in S and may be stored in any suitable data structure. The pixels in P correspond to the bright regions of the knob (see, e.g., FIGS. 2C and 2D). The brightness threshold T may be computed as follows. The pixel values in S have two distinct modes, one corresponding to the bright regions on the knob rings, and the other combining the dark regions on the rings and the visible screen surface contained within S. A histogram of the pixel values in S is computed to recover these modes. Since the data is bimodal, the histogram will have two distinct peaks, one peak corresponding to the dark pixels, and a second smaller peak corresponding to the bright pixels of the knob. The brightness threshold T can be determined by computing the lowest point along the histogram between these two peaks. The intensity value corresponding to this lowest point is set as the threshold T.

The convex hull of P is then computed. The convex hull of a set of points is the smallest convex polygon formed from a subset of those points that completely encloses all the points. Let C denote the convex hull points such that the polygon is constructed by joining $C_1$ to $C_2$, $C_2$ to $C_3$, and so on. C is a subset of P. By definition, a point $C_i$ will lie along the outer boundary of the knob, i.e., along the outer perimeter of the fixed ring.

If the outer perimeter of the knob is expected to be a known geometric shape in the sub-image, S, the equation of the geometric shape is recovered from C. Knowing the equation simplifies tracing the pixel boundary of the control. Note that the shape of the image of the physical control is affected by the position of the camera and the light source, and the position and shape of the screen. Based on these factors, if it is known (406) that the shape of the image of the knob (as in our example) is circular, the full equation of the circle D (center and radius) is recovered 414 from three points on the circumference. The circle D lies along the outer edge of the circle formed by the knob. FIG. 2D shows an example of the location of circle D with respect to the image of the back of the knob. Because it is expected that |C|>3, a technique such as RANSAC (RANdom SAmple Consensus) may be used to robustly recover the best fitting circle equation. Another technique for recovering the circle equation that may be applied is to use the Hough Transform for circles to recover the center and radius of the circle formed from the $C_i$. In some embodiments, the radius of the knobs, and hence of the circles, is known a-priori, which can be used in estimating an accurate circle equation.

If the number of outliers found when computing the circle equation 414 is too high, there is low confidence 416 in the circle computation. The conclusion is that the points C do not form a circle. This is possible because the knob need not be perfectly circular. Further, even if the knob is circular, the surface may not be perpendicular to the camera axis, and thus the projection of the circular profile will appear distorted in the captured images.

If there is low confidence 416 or if it is not known that the expected shape is a circle 406, a path is traced 408 in the convex hull point to find the circle D along the outer edge of the circle formed by the knob. That is, the pixel properties of the $C_i$ are used to form a closed loop from the $C_i$. To join $C_{i-1}$ to $C_i$, the best path in C is determined that optimizes a suitably defined energy function. The terms in the energy function as when searching for a new pixel may be as follows: pixel edge strength, distance of pixel distance from the locus of the best fitting circle, and the angle formed between the center of the best fitting circle, the previous pixel, and the new pixel which should be less than or equal to 180 degrees. For ease of explanation, the word circle is used to describe a closed loop identified as above although the closed loop may not be a perfect geometric circle. At the end of this process (step 408), we have circle D corresponding to the outer boundary of the knob.

The pixel trajectory $R_B$ is computed 410 based on the circle D. That is, the pixels along a circle that is a few pixels smaller in radius than the outer circle D are recovered. The difference in radius between this circle and the outer circle depends on the extent (thickness) of the binary pattern on the outer ring. The smaller circle will pass approximately through the center of the outer ring. B denotes this smaller circle, and the set of pixels that lie along B are $R_B$. The example of FIG. 2D illustrates the relative position of B with respect to D in the image of the back of the knob. To obtain circles of smaller radii, morphological operations are used as there is not an analytical description of the shape. First, the pixels within the circle D are flood filled. Then to get a circle with a ~1 pixel smaller radius, an erosion operation with small filter, e.g., a 3×3 filter, is applied. This can be repeated to get smaller and smaller circles.

In a similar fashion, the pixel trajectory $R_A$ of the inner ring of the knob is also determined 412 from the circle D. A concentric circle with a smaller radius than B is traced to identify the pixels along the center of the inner ring of the knob. The radius of this innermost circle, A, can be predetermined if the size of the inner circle is known a-priori. If not, the radius can be determined using an iterative scheme as shown in the example pseudo code of Table 1. The example of FIG. 2D illustrates the circle A with respect to circles B and D traced on the image of a knob.

TABLE 1

Figure 9:
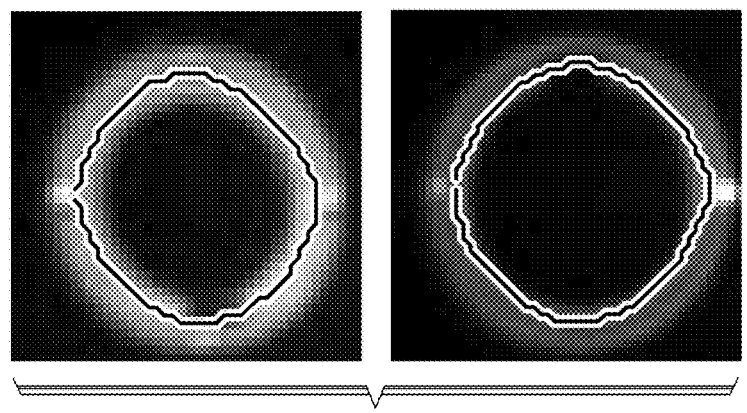

Set A = B
Let Pb be the binary pattern along pixels in $R_B$
Let Pa be the binary pattern along pixels in $R_A$
while Pa == Pb
    decrement the radius of the circle A
    find new set of points $R_A$ corresponding to updated A
    recover binary pattern Pa based on these new set $R_A$
endloop
note the final radius of A and the set of pixels $R_A$ Using this iterative scheme, the outer edge of the inner ring of the knob is recovered. The same procedure can be applied to obtain the inner edge of the inner ring by replacing B with A and looking for a change in the binary pattern as the inner edge is crossed. Alternately, the radius of A can be reduced by a few pixels, and used in the equation of the circle passing through the inner ring. Two actual examples of the result of estimating $R_A$ using the described technique are shown in FIG. 9. The pixel trajectory $R_A$ is overlaid on the image of the knob. Note that in both cases, but especially for the image on the left, the image of the circular knob is distinctly non-circular.

Figure 5:
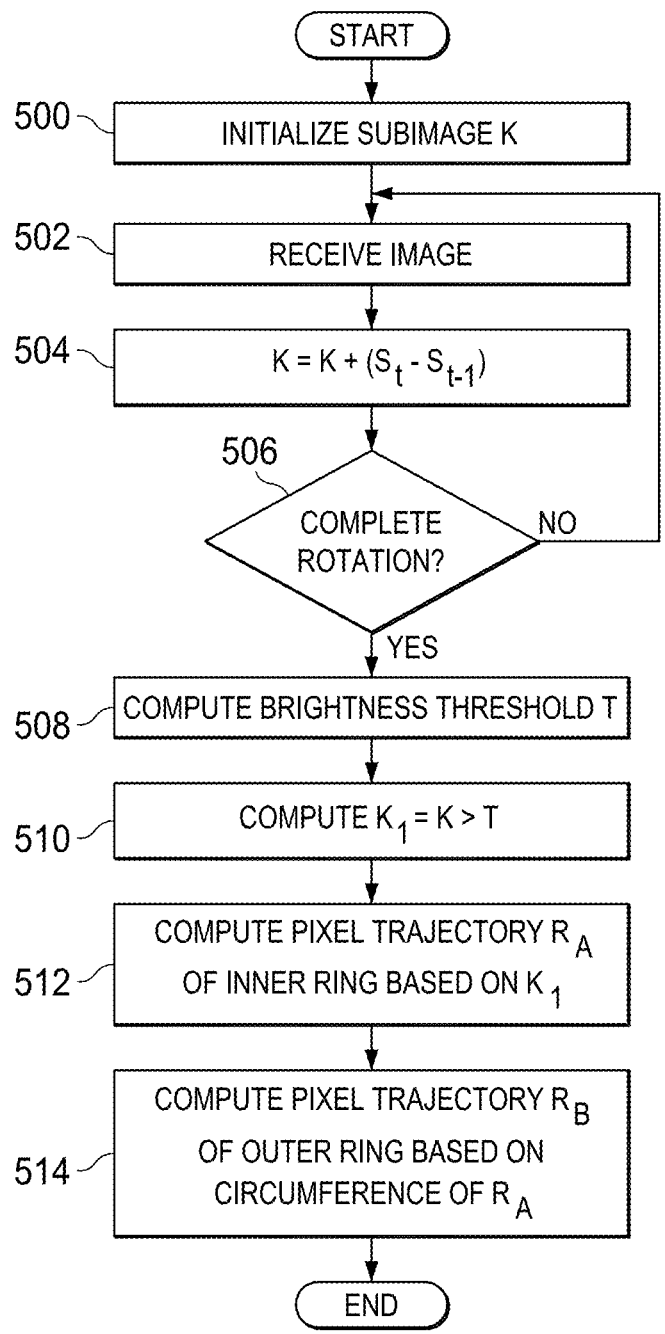

FIG. 5 is a flow diagram of a method for identifying the pixel trajectories $R_B$ and $R_A$ of a knob from an image. This method uses the fact that only the inner ring of the knob moves when the knob is rotated. Initially, a sub-image K of the same size as the bounding box for the knob is initialized 500 to all zeros. The knob is then physically rotated through ~380 degrees (360 degrees for a full circle and a few more degrees to create some overlap). As the knob is rotated 506, images of the display screen captured by the camera are received and analyzed.

For each received image 502 (except the first one), a sub-image of pixels $S_t$ contained within the bounding box for the knob is extracted from the image. Then, $K=K+(S_t-S_{t-1})$ is computed, where $S_{t-1}$ is the sub-image extracted from the previous image. After the rotation of the knob is completed 506, K contains the path traced out by the notch (dark portion) in the inner ring. Since only the inner ring rotates, the pixels in K will include a near-circular band of bright pixels corresponding to the path of the notch.

A brightness threshold T is computed 508 from K and is applied 510 to the pixels in K to identify the bright pixels $K_1$ in K, i.e., K is binarized using the threshold T to generate $K_1$. The threshold T may be computed from a histogram of K as previously described herein. The pixel trajectory $R_A$ of the inner ring of the knob is then computed based on $K_1$. Any suitable technique may be used to determine $R_A$. For example, one technique that may be used is to preserve only those pixels in $K_1$ that have at least one 4-connected neighbor that is 0. In another example technique, the convex hull of $K_1$ can be computed. Because the on-pixels in $K_1$ form a near-circular continuous loop, the convex hull will typically contain most of the points along the boundary. These points can be joined using linear segments to give the outer boundary of the inner ring. In order to get to the center of the inner ring, the morphology-based technique previously described can be used to find a concentric loop a few pixels closer to the center.

The pixel trajectory $R_B$ of the outer ring of the knob is then computed based on $R_A$. Any suitable technique may be used to determine $R_B$. For example, the pixels within the outer boundary of the inner ring may be flood-filled to generate a binary blob of the shape of the inner ring of the knob. This blob may then be dilated a few times to create a larger blob of the same shape. For example, if the expected radius of $R_B$ is n pixels greater than $R_A$, the blob can be dilated n times using a 3×3 mask. The number of times dilation is applied depends on how much bigger circle B is expected to be compared to A. Each dilation with a 3×3 mask increases the radius by 1 pixel. Finally, the same techniques as previously described may be used to extract the boundary of this larger blob. This boundary will pass through the central portion of the outer ring.

Figure 10:
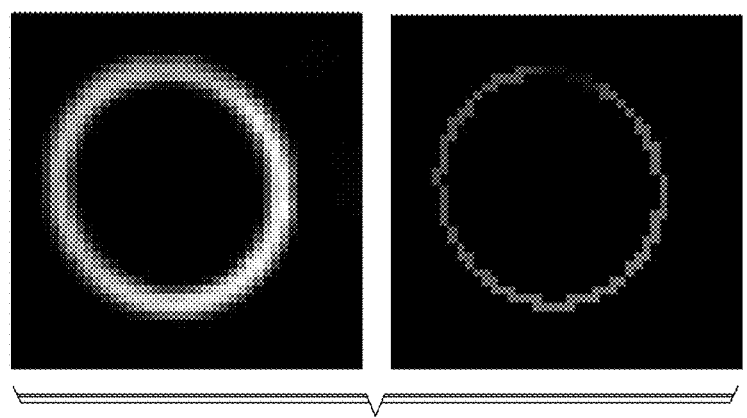

In some embodiments, another technique may be used to compute the pixel trajectory $R_A$ from $K_1$. The profile of the pixels along radial line segments from the centroid of to the edge may be analyzed. The profile will contain a distinct low-to-high edge and another high-to-low edge. Identifying the mid-point between these edges gives the location of the center of the band of bright pixels in $K_1$, which corresponds to $R_A$. An actual example of the result of applying an embodiment of this method is shown in FIG. 10. The image on the left shows the image K of the bright closed loop. The image on the right is the trajectory $R_A$ computed from K.

Figure 6:
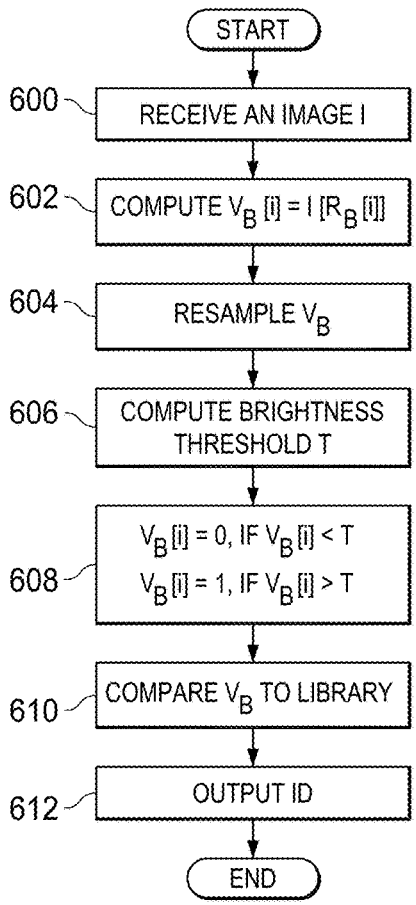

FIG. 6 is a flow diagram of a method for identifying a knob based on the pixel set $R_B$. This method may be used when a system needs to actively identify a knob. Each individual knob mounted on the display screen may be associated with a separate task or function in the user interface. By identifying the knob, the user interface can be informed which specific knob is being updated when the user interacts with the system. This de-couples the physical location of the knob from the function of the knob. Thus the user or the manufacturer can place knobs anywhere on the display screen, and the system will still be able to identify the knob and associate the right control for the knob.

Initially an image I is received 600. The luminance values $V_B$ of the image along the pixel coordinates $R_B$ are then extracted 602, i.e., $V_B[i]=I[R_B[i]]$. $V_B$ is then re-sampled 604 to a pre-determined length. This pre-determined length may be any suitable value and may be empirically determined.

A brightness threshold T is then computed 606 for $V_B$ and $V_B$ is binarized 608 based on this threshold. $V_B$ should be distinctly bi-modal, with some values close to 0 and other values clustered around an intensity value distinctly higher than 0. The brightness threshold T may be determined using the histogram technique previously described herein.

$V_B$ is then compared 610 to the previously mentioned library of binary patterns corresponding to all of the knobs mounted on the display screen to determine an identifier for the knob. The values of $V_B$ represent a binary string as do the binary patterns in the library. The knob is assigned an identity corresponding to the best matching pattern from the library. To compensate for uncertainties in recovering the binary string from the image, the Hamming distance to measure the similarity $V_B$ of against the library of strings.

Figure 7:
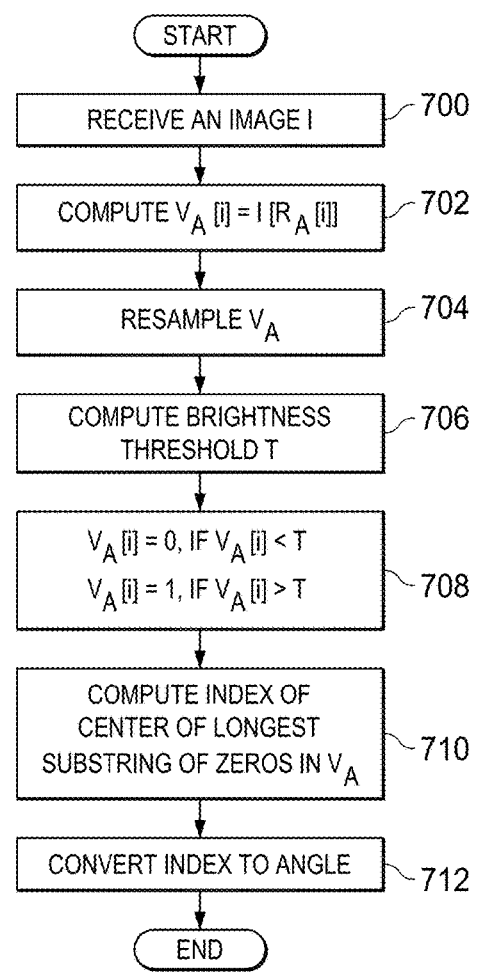

FIG. 7 is a flow diagram of a method for determining the state of a knob based on the pixel set $R_A$. The state of a knob is represented by the angle at which the knob is rotated. The method description assumes that a knob may be rotated from 0 to 360 degrees. One of ordinary skill in the art will understand embodiments in which the rotation range is different.

Initially an image I is received 700. The luminance values $V_A$ of the image along the pixel coordinates $R_A$ are then extracted 702, i.e., $V_A[i]=I[R_A]]$. The pixel coordinates of $R_A$ form a loop in the image. The start point of the loop is the location at which the knob is at the 0 degree location. Thus, the first element of $V_A$ is the pixel value closest to the 0 degree knob location. The subsequent elements are filled in a clock-wise or counter clock-wise direction depending on the application of the knob.

$V_A$ is then re-sampled 704 to a pre-determined length. This pre-determined length may be any suitable value and may be empirically determined. A brightness threshold T is then computed 706 for $V_A$ and $V_A$ is binarized 708 based on this threshold. $V_A$ should be distinctly bi-modal, with some values close to 0 and another set of values clustered around an intensity value distinctly higher than 0. The brightness threshold T may be determined using the histogram technique previously described herein. The binarization of $V_A$ results in a string in which zeroes correspond to the notch (IR absorptive material on the knob), and ones correspond to the remaining part of the circle $R_A$. If the length of the notch is known a-priori, this knowledge can be used to improve the accuracy of the thresholding to obtain the exact extent of the notch. In some embodiments, $V_A$ is smoothed to remove noise, for example using an averaging filter or a 1D Gaussian filter.

An index of the center of the longest substring of zeros in $V_A$ is then computed 710. To compute this index, the binary string $V_A$ is stored in a circular array. For example, assume $V_A$=[1 1 1 0 0 0 0 0 1 1 1 0 1 1 1]. The longest sub-string of 0s starts at index 4 and ends at index 8. The index of the center of the substring is thus 6. The circular data structure helps in resolving issues when some of the notch values are at one end of $V_A$ and the remaining values are at the other end. For example, assume $V_A$=[0 0 0 1 1 1 1 1 1 1 1 1 1 0 0]. Because $V_A$ is stored in a circular array, the longest substring of 0s can be identified as starting at index 14 and ending at location 3. The computed index corresponds to the location of the head or pointer of the knob, and will have a value between 0 and the re-sampled length of $V_A$.

Figure 11:
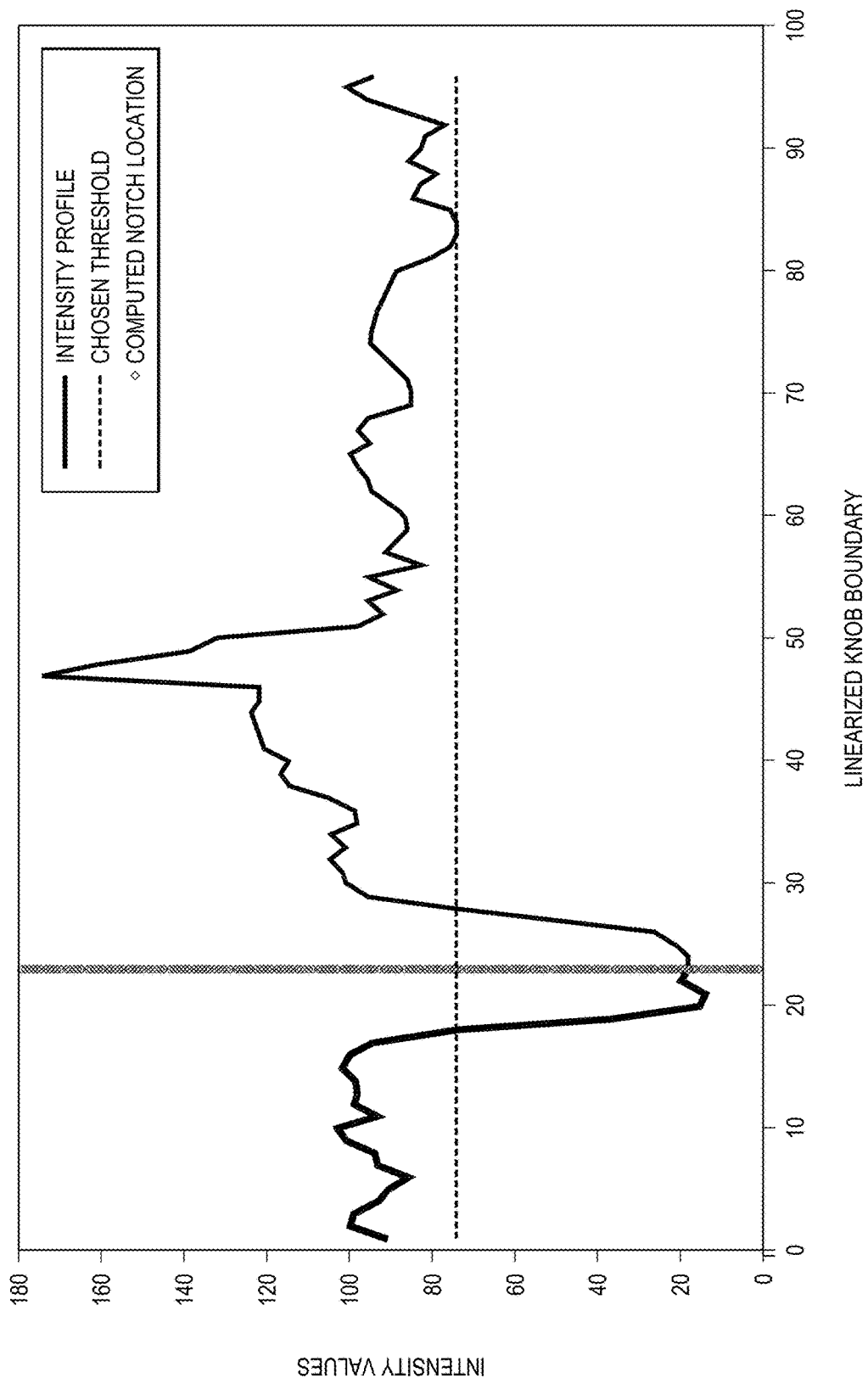

A profile of $V_A$ values recovered from an actual knob is shown in FIG. 11. The figure shows the grayscale values recovered from the image along the trajectory $R_A$. Note that the values are bimodal—most of the pixels are around intensity 100 and a smaller number of pixels are around intensity 20. The figure also shows the computed threshold, which is approximately 80 in this example. In addition, the figure shows the computed index of the center of the notch, which corresponds to the head of the knob.

Figure 12:
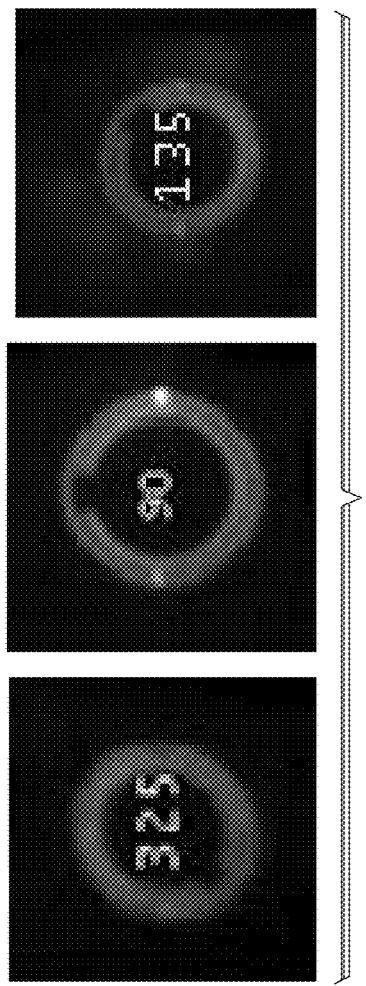

The computed index is then converted 712 to an angle 712 which is the state of the knob. The index may be converted to degrees by computing G=360*(K/N), where K is the index and N is the re-sampled length of $V_A$. Examples of the angle of displacement for three actual knobs using the described techniques are shown in FIG. 12. In each of these examples, the 0 degree position of the knob is with the notch facing directly to the left.

Some additional techniques may be used in embodiments of the method of FIG. 7 to improve the accuracy and resolution of the computed angle G. For example, if the length of the resampled array is longer than the length of $R_A$, the values of the added elements may be calculated by interpolating intensities of neighboring elements. These interpolated values may be compared against the threshold T. In this way, the intensities of pixels neighboring a boundary may be used to increase the detection to sub-pixel resolution. In another example, the inner ring of a knob may be designed with multiple notches, given the constraint that the pattern is unambiguous in orientation (does not repeat). The position of each notch may be calculated independently and all positions may be averaged together to reduce jitter. In another example, the overall knob position may be determined by calculating the error between an ideal template at various positions and the measured string $V_A$, then choosing the position with least error. By using multiple notches, errors in calculated positions may be averaged out.

Figure 13:
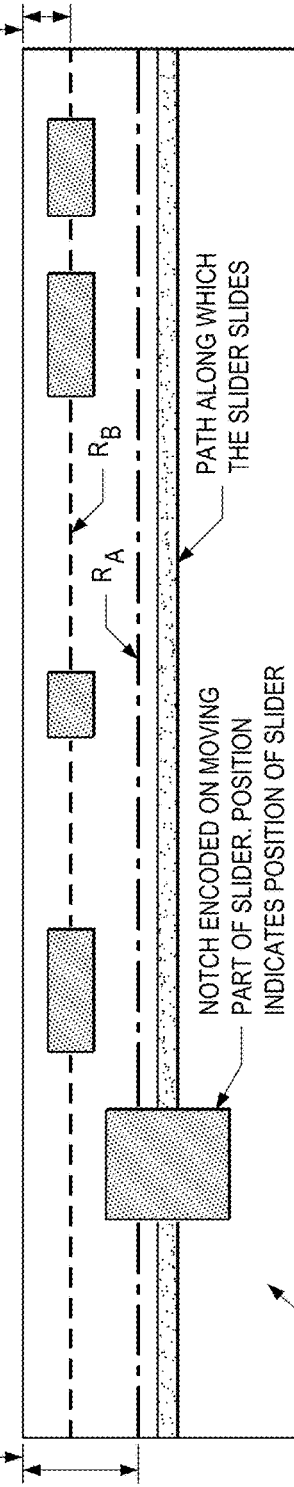
FIG. 13 is an example of a slider physical control.

As previously mentioned, one of ordinary skill in the art, given the benefit of the above method descriptions, will understand embodiments in which controls other than annular controls are located, identified, and the state determined. While these descriptions have used knobs as an example, the same principles, and in many cases, the same algorithms can be applied to other controls such as different kinds of knobs, sliders, etc. FIG. 13 shows an example of the back (camera) view of a slider control. In the figure, the pixel trajectories corresponding to $R_A$ and $R_B$ have been marked. Reading the pixel values along $R_A$ and applying the same techniques as described earlier, the state of the slider can be recovered. Similarly, reading $R_B$ can provide the identity of the slider.

Since a slider is composed of linear edges, it is easier to recover the trajectories $R_A$ and $R_B$. The outer boundaries of the back of the slider can be entirely coated with highly reflective IR substance. This makes it simpler to recover the long edge of the slider control, e.g., by detecting edges in the image and then applying a straight line detector such as the Hough transform to identify the location and length of the line corresponding to the edge of the control. If the expected length of the control is known a-priori, this information can make the line detection even more robust. Once the edge is detected, $R_A$ and $R_B$ can be located by tracing a straight line parallel to that edge at known (pre-determined based on the dimensions of the control) distances from the edge.

The trajectory $R_B$ passes through a unique binary pattern inscribed on the back face of the control using materials of different IR reflectance. As previously mentioned, this binary pattern uniquely identifies each control. The trajectory $R_A$ passes through the projection of the moving part of the slider control. The moving part of the slider is coated with an IR absorptive material that produces a notch (or dip in intensity) similar to that seen in the moving ring of the knob. Thus when the intensity values along $R_A$ are read out, it will appear bimodal, with the lower values corresponding to the location of the slider. This profile of intensity values is analyzed to determine the location of the slider using techniques described previously for computing the state of the knob.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments are described herein in which IR LEDs provide the light source and an IR camera is used to capture the images. One of ordinary skill in the art will understand embodiments in which the light source produces light in other than the IR band and the corresponding imaging sensor is tuned to this light. As is well known, there are two main criteria for choosing a suitable light source: 1) the light should be within a narrow band in the electromagnetic spectrum so that the sensor (camera) can be tuned to detect only that specific band of light energy, and 2) if visible light is projected on the screen, for, e.g., a visible user interface, the light used for touch detection should be distinct from the visible light spectrum so that the projected RGB video does not interfere with the touch detection process.

In another example, embodiments are described herein in which the light source, camera, and projector are positioned behind the touch surface. One of ordinary skill in the art will understand embodiments in which the light source, camera, and projector are suitably positioned in front of the touch surface and/or behind the touch surface. For example, the projector may be appropriately positioned in front of the touch screen and the light source and camera may be appropriately positioned behind the touch screen.

In another example, embodiments are described herein in which a projector is used to project a user interface on a display screen. One of ordinary skill in the art will understand embodiments in which a projector is not used. For example, in some low-cost touch systems with fixed functionality, the user interface may be directly "painted" onto the display screen and does not change. When a user operates the physical control on the display screen, the state of the physical control may be determined as described herein and an application may be triggered responsive to the state of the physical control to, e.g., deliver a selected product or to capture a photograph or to increase a temperature or to generate a sound, or to issue a ticket or to dim a light or to summon a waiter, etc.

Embodiments of the methods, the application processor 112, and the touch processor 110 described herein may be implemented in hardware, software, firmware, or any suitable combination thereof, such as, for example, one or more digital signal processors (DSPs), microprocessors, discrete logic, application specific integrated circuits (ASICs), field-programmable gate arrays (FPGAs), etc. The application processor 112 and the touch processor 110 may be separate processors or may be implemented as a single system on a chip (SoC) such as an Open Multimedia Application Platform (OMAP) SoC available from Texas Instruments, Inc. Any software instructions may be initially stored in a computer-readable medium and loaded and executed in a processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method comprising:
    projecting, by an infrared light source, infrared light through a rear surface of an illuminated surface of a touch screen display;
    receiving a reflection of the projected infrared light as an infrared image, wherein the infrared image is captured by an infrared camera;
    identifying a physical control attached to the illuminated surface of the touch screen display by analyzing a reflection of a first binary pattern of the physical control in the infrared image, the physical control having a non-rotatable portion and a rotatable portion, a back surface of the non-rotatable portion of the physical control comprising the first binary pattern and a back surface of the rotatable portion of the physical control comprising a second binary pattern;
    determining a rotational state of the physical control attached to the illuminated surface of the touch screen display by analyzing a reflection of the second binary pattern of the physical control in the infrared image; and
    outputting an indication of the rotational state of the physical control.

2. The method of claim 1, further comprising:
    outputting an identity indicator for the physical control in association with the rotational state.

3. The method of claim 2, wherein identifying the physical control comprises:
    determining a set of points that lie along the non-rotatable portion of the physical control;
    extracting a set of pixel values corresponding to the set of points from the infrared image; and
    determining the identity indicator based on the set of pixel values.

4. The method of claim 3, wherein determining a set of points comprises:
    computing the set of points from a sub-image of the infrared image of the illuminated surface captured by the infrared camera, the sub-image corresponding to a pre-determined bounding box specified for the physical control.

5. The method of claim 1, wherein determining a rotational state of a physical control comprises:
    determining a set of points that lie along the rotatable portion of the physical control;
    extracting a set of pixel values corresponding to the set of points from the infrared image; and
    determining the rotational state based on the set of pixel values.

6. The method of claim 5, wherein determining a set of points comprises:
    computing the set of points from a sub-image of the infrared image of the illuminated surface captured by the infrared camera, the sub-image corresponding to a pre-determined bounding box specified for the physical control.

7. The method of claim 5, wherein determining the rotational state comprises:
    locating a subset of consecutive pixel values of like intensity distinct from other pixel values in the set of pixel values, wherein the subset corresponds to a state indicator encoded on the rotatable portion of the physical control; and
    determining the rotational state from a position of the subset corresponding to the state indicator in the set of pixel values.

8. The method of claim 1, wherein the physical control is a knob, and the rotational state of the physical control is an angle of rotation of the knob.

9. A digital system, comprising:
    a touch screen display having an illuminated surface;
    a physical control mounted on the illuminated surface of the touch screen display, the physical control having a non-rotatable portion and a rotatable portion, a back surface of the non-rotatable portion of the physical control comprising a first binary pattern and a back surface of the rotatable portion of the physical control comprising a second binary pattern;
    an infrared light source configured to project infrared light through a rear surface of the illuminated surface of the touch screen display;
    an infrared camera positioned to capture a reflection of the projected infrared light as an infrared image; and
    one or more processors configured to:
    receive the infrared image captured by the infrared camera;
    identify the physical control by analyzing a reflection of the first binary pattern of the physical control in the infrared image;

determine a rotational state of the physical control by analyzing a reflection of the second binary pattern of the physical control in the infrared image; and output an indication of the rotational state of the physical control.

10. The digital system of claim 9, wherein the one or more processors are further configured to:

output an identity indicator for the physical control in association with the rotational state.

11. The digital system of claim 10, wherein the one or more processors are further configured to:

determine a set of points that lie along a fixed portion of the physical control;

extract a set of pixel values corresponding to the set of points from the infrared image; and determine the identity indicator based on the set of pixel values.

12. The digital system of claim 11, wherein the one or more processors are further configured to:

compute the set of points from a sub-image of the infrared image of the illuminated surface captured by the infrared camera, the sub-image corresponding to a predetermined bounding box specified for the physical control.

13. The digital system of claim 9, wherein the one or more processors are further configured to:

determine a set of points that lie along the rotatable part of the physical control;

extract a set of pixel values corresponding to the set of points from the infrared image; and determine the rotational state based on the set of pixel values.

14. The digital system of claim 13, wherein the one or more processors are further configured to:

compute the set of points from a sub-image of the infrared image of the illuminated surface captured by the infrared camera, the sub-image corresponding to a predetermined bounding box specified for the physical control.

15. The digital system of claim 13, wherein the one or more processors are further configured to:

locate a subset of consecutive pixel values of like intensity distinct from other pixel values in the set of pixel values, wherein the subset corresponds to a state indicator encoded on the rotatable part of the physical control; and determine the rotational state from a position of the subset corresponding to the state indicator in the set of pixel values.

16. The system of claim 9, wherein the physical control is a knob, and the rotational state of the physical control is an angle of rotation of the knob.

17. A non-transitory computer readable medium storing instructions that, when executed by a processor comprised in a digital system, cause the digital system to:

project an infrared light through a rear surface of an illuminated surface of a touch screen display;

receive a reflection of the projected infrared light as an infrared image;

identify a physical control attached to the illuminated surface of the touch screen display by analyzing a reflection of a first binary pattern of the physical control in the infrared image, the physical control having a non-rotatable portion and a rotatable portion, a back surface of the non-rotatable portion of the physical control comprising the first binary pattern and a back surface of the rotatable portion of the physical control comprising a second binary pattern;

determine a rotational state of a physical control by analyzing a reflection of the second binary pattern of the physical control in the infrared image; and output an indication of the rotational state of the physical control.

18. The computer readable medium of claim 17, wherein the instructions further cause the digital system to:

determine a set of points that lie along the rotatable portion of the physical control;

extract a set of pixel values corresponding to the set of points from the infrared image; and determine the rotational state based on the set of pixel values.

* * * * *